United States Patent Office 2,729,560
Patented Jan. 3, 1956

2,729,560
WET STRENGTH PAPER CONTAINING AMINO-ALIPHATIC CHAIN POLYMER RESINS

Ronald R. House, Darien, and Sewell T. Moore and Arthur M. Schiller, Stamford, Conn., assignors to American Cyanamid Company, New York, N. Y., a corporation of Maine No Drawing. Application June 22, 1953,
Serial No. 363,394

9 Claims. (Cl. 92—3)

This invention relates to the manufacture of resin treated cellulosic fibers and fibrous materials prepared therefrom, and is directed particularly to a method for imparting wet strength to felted fibrous cellulosic materials such as paper, board, shaped pulp articles and the like. The invention also includes, as an additional important feature, the production of sized paper, board and the like which will retain their sizing under alkaline conditions. The invention includes the improved cellulosic fibers and fibrous products themselves, including both sized and unsized materials, as well as methods of preparing these products as will hereinafter be more fully described.

It is a principal object of the present invention to provide papermaking fibers and paper, board and other fibrous products prepared therefrom, impregnated with a novel class of aminoaliphatic chain polymer resins which impart wet tensile strength thereto. A further object of the invention consists in the application of these resins to water suspensions of hydrated or unhydrated pulp in the beater, stock chest, head box or at any other suitable point ahead of the paper-forming step. Another important object is the application of the resins to the fibers of preformed paper as an aqueous spray or as a tub size, either alone or in admixture with other impregnating agents.

We have found that the above and other objects are accomplished by applying to fibrous cellulosic material such as paper pulp or the fibers of preformed paper a type of resinous material which is hereinafter described as aminoaliphatic chain polymer resin. We have found that resins of this class are substantive to fibers of cellulosic material such as paper pulp in aqueous suspension; i. e., the resin is selectively adsorbed or absorbed by the cellulosic fibers from a dilute aqueous solution or dispersion thereof containing these fibers in amounts much greater than those corresponding to the concentration of resin in the solution or to what would be contained in the water normally left in the sheet after forming. This permits the application to cellulosic fibers of sufficient quantities of the wet strength-imparting resin to produce the desired degree of wet strength while the fibers are in dilute aqueous suspensions of the consistency ordinarily used in paper mills, which is about 0.1-6% or, in special processes, at higher consistencies.

The aminoaliphatic chain polymer resins used in practicing our invention are prepared from linear aliphatic chain polymers wherein carboxylic acid amide groups are attached to carbon atoms of the polymer-forming chain. A number of polymers and copolymers of this type are well known, and may be used as raw materials. However, the preferred materials are polyacrylamide, polymers of lower alkyl-substituted acrylamides such as polymethacrylamide and polyethylacrylamide and copolymers of these acrylamides with acrylonitrile.

The above-described starting materials are known to exist in the form of both low polymers and relatively high polymers, and either form may be used in practicing our invention. It is known, for example, that polyacrylamides of controlled molecular weights can be obtained by polymerizing acrylamide in water containing approximately 5 to 40% by volume of a water-miscible alcohol such as ethanol or isopropanol; by this procedure polymers having molecular weights as low as 2,000 or as high as 300,000 can be prepared. Similar procedures may be used in preparing the copolymers described above, and the resulting molecular weights of the products are comparable; i. e., they range from about 2,000 to about 40,000 in the low polymers and from 50,000 to 500,000 or more in the higher polymers. As will subsequently be illustrated, polymers and copolymers of either class may be used with the formation of the corresponding aminoaliphatic chain polymers.

The aminoaliphatic resins which we use are produced by converting part of the carboxylic acid amide groups of linear carbon chain polymers of the above types into amine groups by the action of alkali metal hypohalites in aqueous alkaline solution. This conversion of amide groups into amine groups is known as the Hofmann degradation. It has long been applied to substantially non-polymerized compounds but has only recently been used successfully for the treatment of aliphatic chain polymers of the type under consideration. By employing the reaction conditions hereinafter described, however, a large proportion of the amide groups of polyacrylamides and acrylamide-acrylonitrile copolymers are converted into amine groups with the formation of the desired resinous products.

The products used in practicing our invention are linear carbon chain polymers which contain residual carboxylic acid amide groups in addition to amine groups attached to the carbon chain. The reaction products of the polyacrylamides correspond substantially to the formula

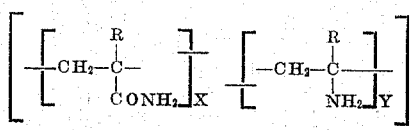

in which R is as defined above and the ratio of X to Y is from 1:4 to 4:1.

In the production of the aminoaliphatic chain polymer resins, linear aliphatic chain polymers and copolymers wherein carboxylic acid amide groups are attached to carbon atoms of the polymer-forming chain as previously described are reacted with an alkaline hypohalite within the temperature range of about 0° to 40° C. In carrying out the reaction, an alkali metal hydroxide is admixed with an alkali metal hypohalite such as a compound of chlorine, bromine or iodine and the mixture brought to reaction temperature. The desired amount of the linear aliphatic chain polymer or copolymer is then introduced into the solution and the reaction carried out for a period of about 15 minutes to about 1 to 2 hours with stirring while maintaining the temperature within the range of from about 0° C. to about 40° C. While it is possible to use the hypohalite solution per se, it is also possible to form the hypohalite solution in situ. The formation of the hypohalite in situ is easily accomplished by adding the halogen to the alkali metal hydroxide. The amount of the reactants that are present should be carefully controlled to yield the desired products. The amount of the linear aliphatic chain polymer or copolymer that is present is calculated by the number of recurring mer-mols of carboxylic acid amide groups present in said polymer or copolymer. When the hypohalite is produced in situ, the amount of the chlorine, bromine or iodine that is added to the reaction mixture is calculated as the mols of alkali metal hypohalite formed. The mol ratio of said polymer or copolymer as above calculated, alkali metal hydroxide, and halogen or the alkali metal hypohalites thereof, will be present in an amount varying from about 1:1.6:0.8, respectively, to about 1:4:2, respectively. It is preferred, however, that the molar ratio be within the range of from about 1:3.5:1.1, respectively, to about 1:3.7:1.3, respectively.

The reaction product is preferably separated from the alkaline reaction mixture by neutralizing the solution with an acid. Suitable acids that may be used to neutralize the solution are such as hydrochloric, sulfuric, phosphoric, etc. During the addition of the acid to the mixture, carbon dioxide is evolved. After the reaction product has been separated it may be hardened by soaking in a water-soluble organic solvent such as, for example, methanol, ethanol, propanol, acetone, dioxane, etc. Inasmuch as the reaction product is water-soluble, it is necessary to maintain an excess amount of said solvent when a water-solvent mixture is used.

The aminoaliphatic chain polymer resins, prepared as described above, can be applied to paper or other felted cellulosic products by tub application methods if desired. Thus, for example, preformed and completely or partially dried paper prepared from a chemical pulp such as sulfite pulp or sulfate pulp or a mechanical pulp such as groundwood or any mixture thereof may be immersed in or sprayed with a 1% to 5% aqueous solution or dispersion of the resin and impregnated with about 50–100% thereof based on the weight of the paper. The paper is then dried by heating for about 0.1 to 5 minutes at temperatures of 212°–300° F., or for shorter times at higher temperatures, whereby the paper is dried and resin-bonding of the fibrils thereof is developed. The resulting paper has greatly increased wet strength, and therefore this method is well suited for the impregnation of paper towels, absorbent tissue and the like as well as heavier stock such as kraft wrapping paper, bag paper and the like.

The preferred process of our invention, however, takes advantage of the substantive properties of the aminoaliphatic chain polymer resins for hydrated cellulosic fibers. These resins are hydrophilic in character; i. e., they are water-soluble or water-dispersible in the form of colloidal solutions under the conditions normally used in preparing paper furnishes, including those containing calcium carbonate or other alkaline sizing materials, and yet they deposit selectively by adsorption or absorption on the fibers of cellulosic paper stock. Accordingly, the resin may be dissolved in an aqueous suspension of the paper stock, or may be predissolved and added thereto as an aqueous solution, and this addition may be made in the beater, stock chest, Jordan engine, fan pump, head box or at any other suitable point ahead of the papermaking wire or screen, followed by forming the treated fibers into a felted product on the wire or cylinder. Although appreciable wet strength is noted when as little as 0.1% of the resin is adsorbed in this manner, it is ordinarily advisable to apply quantities within the range of about 0.5% to 5% or more of the resin solids, based on the dry weight of the paper stock.

The resin-treated stock is run out on the wire or screen of a papermaking machine, such as a Fourdrinier machine, and formed into paper or board in the usual manner and when this is done the resin imparts a substantial degree of tensile strength to the wet web of paper on the machine. This is an important advantage, particularly in running short-fibered stock such as groundwood or chemical pulps made from hardwood, since it reduces breaking of the paper web. It is also an additional demonstration of the bonding power of aminoaliphatic chain polymer resins for the fibers and fibrils of cellulosic paper stock even when the stock is saturated with water.

After adding and incorporating the resin into the furnish and forming the paper or board, the felted product is preferably heated for about 0.1 to 5 minutes at 212°–300° F. in the usual manner to evaporate water therefrom and this heating also increases or further develops the resin bond between the cellulosic fibrils that results in wet strength in the finished product. Tests have shown that although appreciable wet strength is obtained in paper dried at ordinary room temperature, a much higher degree of wet strength is obtained with the same quantity of resin when the paper is dried by heating.

Sized paper is usually made by adding to the cellulosic paper fibers in aqueous suspension a saponified size each as saponified rosin, sodium stearate or other alkali metal salt of higher fatty acids and the like followed by the addition of aluminum sulfate, aluminum chloride or other mordant to precipitate the size on the fibers and then forming the resulting furnish into paper. Paper and paperboard having good water repellency and ink repellency under acid or neutral conditions are obtained by the use of such sizes, but when the stock or the resulting paper is made alkaline the sizing action is completely destroyed. We have found that the application of aminoaliphatic chain polymer resins to the paper fibers before adding the size will produce a number of important advantages. Not only is the retention and efficiency of the aminoaliphatic polymer resin improved by adding the size, but the water-repellency and other characteristics of well sized paper are retained under alkaline conditions. Thus, we have discovered a true cooperation between the resin and saponified sizes wherein each improves properties of the other. We also find that the aminoaliphatic chain polymer resins have a mordanting or precipitating action on the sizes so that the addition of aluminum sulfate or chloride can be substantially reduced or even eliminated if desired. Any desired quantities of resin and size may be employed in this manner; usually quantities of each ingredient on the order of 0.5% to 3%, based on the dry weight of the fiber, are used.

The aminoaliphatic chain polymer resins may also be applied to cellulosic papermaking fibers in conjunction with other resinous materials in cases where special properties are desired. We have found, as an additional important feature of our invention, that the application of this class of resins in conjunction with a polyacrylamide resin will produce greatly improved cohesion between the plies of multi-layer paper. The aminoaliphatic resins themselves improve cohesion, but still better results are obtained when polyacrylamides are used. Thus, for example, beaten paper pulp in aqueous suspension may be treated with 0.5–3% of its weight of aminoaliphatic chain polymer resin and then with 0.5–3% of polyacrylamide and the resulting furnish made into multiply paper or board on a cylinder machine. After heating this paper or board at 212°–300° F. or higher for 1 to 5 minutes in the usual manner it will be found that the paper layers or plies are firmly bonded together and are not easily separated.

The aminoaliphatic chain polymer resins may also be applied in conjunction with other materials used in papermaking. Thus, after first applying the aminoaliphatic polymer resin the stock may be treated with wax size in emulsified form, with a size which is the polyamide condensation product obtained by heating 2–3 mols of stearic acid with 1 mol of a polyalkylenepolyamine at about 200° C. until partial or complete amide formation has taken place, followed by dissolving in acetic acid, or with other known or approved sizing materials. The aminoaliphatic polymer resins may also be applied to preformed paper as a calender size, either alone or in conjunction with starch or other calender sizes.

Heretofore the principal materials used to obtain wet tensile strength in paper have been aminoplast resins such as melamine-formaldehyde resins, urea-formaldehyde resins and the like. The aminoaliphatic chain polymer resins employed in practicing our present invention differ from the aminoplast resins both in their composition and in their properties. They are essentially thermoplastic rather than thermosetting resins; in other words, they are softened by heat and harden upon cooling.

Moreover, the aminoaliphatic resins which we employ are not formaldehyde condensation products and therefore do not give off formaldehyde on heating; in fact, they do not even contain aldehyde groups. For this reason they are especially well adapted for use in gumming papers; i. e., in papers to which a gum or protein adhesive is subsequently to be applied, since they have no premature hardening action on such adhesives. For the same reason they are well suited for use in photographic papers, such as those to which a silver halide or other photosensitive gelatin emulsion is to be applied, since there is no tendency toward hardening of the gelatin or fogging the emulsion as may be the case when formaldehyde-containing resins are used. Because of these and other advantageous characteristics, the application of aminoaliphatic chain polymer resins to paper and paper fibers in accordance with our invention constitutes an important industrial advance.

The invention will be further described by the following specific examples. It will be understood, however, that although these examples may describe in detail some of the specific features of the invention, they are given primarily for illustrative purposes, the scope of the invention being defined by the appended claims.

EXAMPLE 1

24.6 parts of sodium hydroxide was dissolved in 140 parts of water. The resulting solution was cooled to below 5° C. and 19.2 parts of bromine was added, maintaining the temperature at 0–5° C. with an ice bath. 71 parts of a 10% solution of polyacrylamide was added. The reaction mixture was warmed to 25° C. and maintained at 25–35° C. for 40 minutes. The reaction was then neutralized with 34.8 parts of 37% hydrochloric acid whereupon the reaction product precipitated. The reaction product was hardened by the addition of methanol and then filtered off and dried. The product was a yellow powder, completely soluble in dilute acids and soluble in warm water.

Under the conditions used in the present example the Hofmann degradation reaction is about 60% to 70% complete. It is evident, however, that if desired the reaction may be interrupted when a much smaller degree of conversion has been obtained; thus, for example, it may be stopped by neutralization of the mixture with acid when the formation of amine groups is only about 20% complete. On the other hand, as much as 75% to 80% of the amide groups of the copolymers can be converted into amine groups by the process of our invention.

EXAMPLE 2

49.2 parts of sodium hydroxide was dissolved in 600 parts of water and the solution cooled to 0–5° C. 38.4 parts of bromine was added, maintaining the temperature below 5° C. 142 parts of a 10% polyacrylamide solution was added and the temperature raised to 25° C. The temperature was maintained at 25–27° C. for 60 minutes. 69.6 parts of hydrochloric acid was added. The polymer was precipitated in methanol, filtered and dried. The polymer was soluble in warm water and in dilute acid.

EXAMPLE 3

29.4 parts of sodium hydroxide was added to 317 parts of water. To this solution 341 parts of a 5.25% sodium hypochlorite solution was added. The mixture was cooled to 22° C. and 142 parts of a 10% polyacrylamide solution was added. The reaction was carried out at 22–27° C. for one hour. At the end of the reaction time the solution was neutralized to a pH of 8. The product was separated from the liquor and soaked for 30 minutes in 65/35 methanol-water to harden the polymer. The product was dried by vacuum desiccation.

EXAMPLE 4

59.8 parts of sodium hydroxide was added to 634 parts of water. To this solution 682 parts of a 5.25% sodium hypochlorite solution was added. The mixture was cooled to 22° C. and 340 parts of a 10% polymethacrylamide solution was added. The reaction was carried out at 22–27° C. for one hour. At the end of the reaction time, the solution was neutralized to a pH of 8. The product was separated from the liquor and soaked for 30 minutes in 65/35 methanol-water to harden the polymer. The reaction product was then dried by vacuum desiccation.

EXAMPLE 5

35.9 parts of sodium hydroxide were added to 225 parts of water and the solution cooled to 0–5° C. To this solution 27.9 parts of bromine was added while maintaining the temperature below 5° C. 145 parts of a 10% polyethylacrylamide solution was then added and the reaction was carried out at 25–30° C. for 1 hour. At the end of the reaction time, the solution was neutralized with hydrochloric acid to a pH of 8. The product was separated from the liquor and soaked for 30 minutes in 65/35 methanol-water to harden the polymer, which was then dried by vacuum desiccation. The nitrogen content of the product was 17.6%.

EXAMPLE 6

A solution of 56 grams of ethanol in 1 liter of water was charged into a reaction flask and heated to 60° C. after which 53 grams of acrylonitrile and 71 grams of acrylamide were added. The solution was heated to reflux and 2.5 grams of ammonium persulfate, dissolved in a little water, was added. The mixture was stirred at reflux under a slow stream of nitrogen for a total of 90 minutes after which the copolymer was collected on a filter and washed with water.

A portion of this material weighing 12.4 grams was converted into the corresponding aminoaliphatic hydrocarbon chain polymer by the procedure described in Example 1; i. e., by suspending it in a cold solution containing 30 grams of sodium hypobromite and 15 grams of sodium hydroxide and reacting the mixture at 25–35° C. for 40 minutes. The resulting product after washing with methanol and drying was obtained as a light colored powder. It was a linear hydrocarbon chain polymer containing aminoethylene groups copolymerized with acrylonitrile and unconverted acrylamide groups in the recurring unit

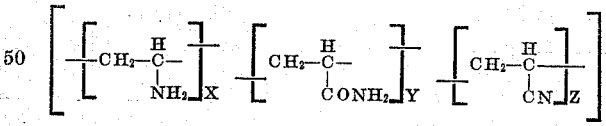

in which the ratio of X to Y is approximately 6 to 4 and ratio of X+Y to Z is 1:1.

EXAMPLE 7

Aminoaliphatic chain polymers were prepared from polyacrylamides under varying reaction conditions and the products were applied to aqueous paper pulp suspensions with and without the addition of aluminum sulfate after which the treated stock was made into paper and tested for dry and wet tensile strength.

The preparation of the resins is outlined in Table I wherein the quantities of reagents represent grams. The hypobromite solutions were prepared by cooling a solution of the required amount of sodium hydroxide to 0°–5° C. and adding the bromine while maintaining the temperature below 5° C. The hypochlorite solutions were made by dissolving the sodium hydroxide in a 5.25% solution of sodium hypochlorite while cooling. A 20% excess of hypohalite was usually used and the molar ratio of sodium hydroxide to hypohalite was usually 3 to 1. The hypochloric acid was added to terminate the Hofmann reaction and precipitate the resin, after which the supernatant liquid was removed and the products soaked in a 60:40 methanol-water mixture and then dried for 2 hours at 65–70° C.

*Table I*

| POL-1 No. | Resin No. | 10% Polyacrylamide Wt. | 10% Polyacrylamide Viscosity, cp. | 97.7% NaOH | 5.25% NaOCl | Bromine | Water | 37.3% HCl | Temp., °C. | Time, Min. |
|---|---|---|---|---|---|---|---|---|---|---|
| 1854A | 1 | 71 | 32,000 | 24.7 | | 19.2 | 200 | 29.2 | 45–50 | 6 |
| 1854B | 2 | 71 | 32,000 | 24.6 | | 19.2 | 140 | 29.2 | 25–35 | 39 |
| 1862 | 3 | 142 | 32,000 | 49.2 | | 38.4 | 600 | 58.4 | 25–27 | 60 |
| 1869 | 4 | 142 | 36,700 | 29.4 | 344 | | 314 | 59.2 | 25–28 | 60 |
| 1870 | 5 | 142 | 36,700 | 16.3 | 287 | | 300 | 28.4 | 25–29 | 40 |
| 1871 | 6 | 71 | 36,700 | 14.7 | 172 | | | 29.6 | 25–27 | 35 |
| 1874 | 7 | 142 | 14,000 | 29.4 | 341 | | 317 | 59.2 | 25–29 | 60 |
| 1875 | 8 | 142 | 5,000 | 29.4 | 341 | | 317 | 59.2 | 25–29 | 60 |
| 1876 | 9 | 142 | 874 | 29.4 | 341 | | 317 | 59.2 | 25–29 | 60 |

The aminoaliphatic resins were dissolved in water to 0.5–3% solutions and added to aqueous suspensions of cellulosic paper stock which were then formed into paper on a laboratory Nash handsheet machine. For a pH of 4.5 the deckle was buffered with potassium acid phthalate; for higher pH values the stock and deckle was adjusted with either hydrochloric acid or sodium hydroxide.

Bleached Canadian kraft pulp was used in all cases except in batches 1–6 of the table below, where unbleached Canadian kraft was used. The stock was beaten in the usual manner, diluted to 0.6% consistency, and the indicated quantities of resin were added with or without alum. In Table II the percent of resin solids added is based on the dry weight of the fiber. After forming the sheets were couched from the wire and dried on blotting paper on a drum drier for 2 minutes at 240° F.; some of the handsheets were also given an additional cure of 10 minutes at 260° F. before testing. The test results with these sheets are listed in Table II under the heading "Extra cure." A few sheets were not heated but were air dried on blotters at room temperature. In the headings, "Alum" indicates that 3% of papermakers alum on the dry fiber weight was added to the stock, "pH" indicates the pH of the stock and deckle before the sheets were formed, and "Basis weight" is the weight in pounds of 500 sheets 25 x 40 inches in size. Tensile strength is the breaking strength of the sheet in pounds per inch width. "Resin No." indicates the resin used, as described opposite the corresponding number in Table I.

Table II shows that good resin retention by the fibers and good wet strength is obtained with any aminoaliphatic chain polymer containing recurring aminoalkylene groups either with or without the addition of alum to the stock and over a wide pH range. Some wet strength was present in the sheets that were simply air-dried at room temperature but much better results were obtained when they were heated as in ordinary paper mill practice. In general, the heating temperatures may vary from 200° to 300° F. and the time may be as short as 30–60 seconds (usually at temperatures of 250°–300° F. or higher) or as long as 10 to 15 minutes or more. The increased wet strength produced by such longer time is shown in the table under the heading "Extra cure." For most purposes, however, adequate resin bonding of the fibers is obtained simply by drying the sheet in contact with drying rolls heated to 212° F. to about 240°–260° F. for about 1 to 3 minutes, which represents the drying conditions now used in most paper mills.

*Example 8*

29.4 parts of sodium hydroxide was added to 317 parts of water. To this solution 341 parts of a 5.25% sodium hypochlorite solution was added. The mixture was cooled to 22° C. and 142 parts of a 10% polyacrylamide solution was added. The reaction was carried out at 22–27° C. for one hour. At the end of the reaction time the solution was neutralized to a pH of 8 to precipitate the product. The product was separated from the liquor and soaked for 30 minutes in 65/35 methanol-water to harden the

*Table II*

| Batch No. | Resin No. | Resin Percent | Alum Added | pH | Basis Wt. | Regular Cure Dry | Regular Cure Wet | Extra Cure Dry | Extra Cure Wet | Air Dry Dry | Air Dry Wet |
|---|---|---|---|---|---|---|---|---|---|---|---|
| 1 | 1 | 3 | No | 4.5 | 42.5 | 27.8 | 3.8 | 27.0 | 5.0 | | |
| 2 | 1 | 3 | No | 9.0 | 40.4 | 24.4 | 3.0 | 24.6 | 3.6 | | |
| 3 | 1 | 3 | Yes | 4.5 | 42.3 | 25.1 | 3.2 | 24.0 | 3.9 | | |
| 4 | 2 | 3 | No | 4.5 | 42.3 | 28.4 | 4.4 | 27.2 | 5.2 | | |
| 5 | 2 | 3 | No | 9.0 | 42.0 | 27.6 | 7.0 | 27.5 | 8.3 | | |
| 6 | 2 | 3 | Yes | 4.5 | 43.9 | 28.4 | 5.8 | 26.5 | 5.9 | | |
| 7 | 2 | 3 | No | 9.0 | 46.5 | 32.9 | 6.8 | 32.6 | 8.3 | 29.6 | 3.2 |
| 8 | 2 | 3 | No | 4.5 | 47.6 | 30.1 | 3.8 | 29.3 | 4.9 | 25.6 | 2.1 |
| 9 | 3 | 3 | No | 9.0 | 47.0 | 31.9 | 6.9 | 32.6 | 7.4 | 28.4 | 1.7 |
| 10 | 3 | 3 | No | 4.5 | 46.0 | 32.9 | 4.1 | 31.0 | 5.2 | 24.8 | 1.6 |
| 11 | 4 | 0.5 | No | 6.8 | 45.0 | 28.5 | 3.1 | 30.0 | 4.4 | | |
| 12 | 4 | 0.5 | No | 9.0 | | 30.8 | 3.6 | | | | |
| 13 | 4 | 0.5 | No | 11.0 | | 29.3 | 3.0 | | | | |
| 14 | 4 | 1.5 | No | 6.8 | 46.6 | 30.9 | 5.2 | 32.3 | 6.3 | | |
| 15 | 4 | 1.5 | Yes | 4.5 | | 29.5 | 4.3 | 32.0 | 5.2 | | |
| 16 | 4 | 3 | No | 6.8 | 44.2 | 28.5 | 6.0 | 29.3 | 6.3 | | |
| 17 | 4 | 3 | No | 5.6 | | 25.3 | 4.0 | | | | |
| 18 | 4 | 3 | Yes | 4.5 | 47.9 | 32.3 | 5.6 | 32.0 | 6.7 | | |
| 19 | 5 | 3 | Yes | 4.5 | 49.1 | 20.9 | 2.9 | 31.2 | 3.5 | | |
| 20 | 6 | 3 | Yes | 4.5 | 41.7 | 24.6 | 2.5 | 25.7 | 3.2 | | |
| 21 | 6 | 3 | Yes | 9.0 | 45.2 | 27.0 | 4.7 | 27.1 | 5.1 | | |
| 22 | 7 | 3 | Yes | 4.5 | 43.6 | 27.7 | 3.7 | 30.4 | 4.4 | | |
| 23 | 7 | 3 | Yes | 6.8 | 47.0 | 31.4 | 6.8 | | | | |
| 24 | 8 | 3 | Yes | 4.5 | 46.6 | 31.2 | 4.2 | 30.4 | 5.1 | | |
| 25 | 8 | 3 | Yes | 6.8 | 49.3 | 33.0 | 6.1 | | | | |
| 26 | 9 | 3 | Yes | 4.5 | 46.3 | 29.3 | 3.0 | 30.3 | 3.9 | | |
| 27 | 9 | 3 | Yes | 6.8 | 48.1 | 33.4 | 6.5 | | | | | polymer. The product was dried by vacuum desiccation. The nitrogen content of the product was 16.7%.

Bleached northern kraft paper pulp was beaten in the usual manner and made into an 0.6% water suspension. Samples of the above resin were dissolved to a 1.5% solution by soaking in water, heating and then agitating until solution was complete and portions of these solutions were added to the stock suspension. The stock was adjusted to the pH values indicated below and handsheets were made on a laboratory sheet-making machine. The sheets were couched from the wire on blotting paper, heated for 2 minutes at 240° F. on a laboratory drum drier and samples were tested for dry and wet tensile strength. Other samples were analyzed for nitrogen. The results obtained are shown in Table III.

in water, beaten, diluted with water to 0.6% consistency and treated with the resin of Example 8 by the procedure described in that example. A 2% aqueous dispersion of a commercial rosin size (Acco Gum Size) was then added and incorporated uniformly in the stock suspension. Where alum was used it was added after the incorporation of the rosin size into the stock. The furnish was then formed on a handsheet machine by the procedure described in Example 2 and the sheets were dried by heating 2 minutes at 240° F. as described in that example. Samples were then analyzed for nitrogen to determine their resin content.

Other sheets were tested for wet and dry tensile strength and still others were tested for water repellency and ink resistance in the Currier and B. K. Y. size testing machines. The results are shown in Table IV wherein the

*Table IV*

| Batch No. | Percent Resin | Percent Size | Percent Alum | pH | Percent Resin in Sheet | Basis Wt. | Tensile Strength | | Sizing | |
|---|---|---|---|---|---|---|---|---|---|---|
| | | | | | | | Dry | Wet | Currier | B.K.Y. |
| 1 | None | None | None | 4.5 | | 42.0 | 25.6 | <0.2 | Inst. | Inst. |
|  | None | 3 | 3 | 4.5 | | 45.4 | 21.1 | <0.2 | 62 | 650. |
|  |  |  |  | 9.0 | | 42.0 | 22.7 | <0.2 | 3 | 12. |
| 2 | 3 | 3 | 3 | 4.5 | 2.34 | 47.1 | 27.6 | 5.9 | 44 | 1,530. |
| 3 | 3 | 3 | 3 | 9.0 | 2.34 | 44.9 | 26.1 | 7.5 | 46 | 1,210. |
| 4 | 3 | 3 | None | 9.0 | 2.40 | 46.6 | 27.1 | 6.5 | 61 | 1,005. |
| 5 | 3 | 1 | 1 | 4.5 | 1.86 | 45.7 | 30.1 | 4.2 | 46 | 830. |
| 6 | 3 | 1 | 1 | 9.0 | 2.22 | 44.4 | 26.2 | 7.2 | 50 | >50 min. |
| 7 | 1 | 1 | 1 | 4.5 | 0.90 | 45.3 | 26.7 | 3.6 | 45 | >30 min. |
| 8 | 1 | 1 | 1 | 9.0 | 0.84 | 42.8 | 27.0 | 4.7 | 38 | 1,165. |
| 9 | 1 | 3 | 3 | 9.0 | 0.84 | 45.3 | 26.5 | 5.0 | 41 | 1,850. |
| 10 | 1 | 3 | None | 9.0 | 0.78 | 44.4 | 27.1 | 3.4 | 20 | 690. |
| 11 | 1 | 1 | None | 9.0 | 0.78 | 44.2 | 28.3 | 4.6 | 36 | 785. |
| 12 | 3 | 1 | None | 9.0 | 2.22 | 44.4 | 27.5 | 6.1 | 43 | 340. |

*Table III*

| Batch No. | Percent Resin[1] | pH | Basis Wt. | Tensile Strength | | Percent Nitrogen in Sheet | Percent Resin in Sheet |
|---|---|---|---|---|---|---|---|
| | | | | Dry | Wet | | |
| Control | None | 4.5 | 42.0 | 25.6 | None | | |
|  | None | 9.0 | 42.2 | 26.2 | None | | |
| 1 | 3 | [2]4.5 | 38.8 | 25.8 | 4.4 | 0.50 | 3.0 |
| 2 | 2 | 5.0 | 42.8 | 26.2 | 2.6 | 0.07 | 0.42 |
| 3 | 2 | 5.5 | 48.9 | 24.6 | 2.8 | 0.08 | 0.48 |
| 4 | 2 | 6.0 | 48.9 | 27.4 | 3.2 | 0.09 | 0.54 |
| 5 | 2 | 6.5 | 42.8 | 24.2 | 3.8 | 0.11 | 0.66 |
| 6 | 2 | 7.0 | 46.0 | 25.0 | 4.4 | 0.18 | 1.08 |
| 7 | 2 | 7.5 | 47.1 | 25.0 | 5.8 | 0.20 | 1.12 |
| 8 | 1 | 5.0 | 42.8 | 24.2 | 2.0 | 0.06 | 0.36 |
| 9 | 1 | 5.5 | 41.7 | 22.6 | 2.0 | 0.05 | 0.30 |
| 10 | 1 | 6.0 | 41.7 | 25.8 | 2.2 | 0.06 | 0.36 |
| 11 | 1 | 6.5 | 41.7 | 26.2 | 2.6 | 0.07 | 0.42 |
| 12 | 1 | 7.0 | 42.8 | 21.8 | 2.6 | 0.12 | 0.72 |
| 13 | 1 | 7.5 | 42.8 | 19.2 | 3.0 | 0.13 | 0.78 |
| 14 |  | 8.0 | 39.6 | 20.2 | 3.4 | 0.15 | 0.90 |

[1] Based on dry fiber weight.
[2] 3% of alum added.

These results show that the aminoaliphatic resins are adsorbed by cellulosic papermaking fibers under acid, neutral and alkaline conditions and that they impart wet strength under all of these conditions when the paper is dried by heating on a drying roll at a temperature and time corresponding to those normally used commercially in a paper mill. The figures also show, however, that the resin retention and wet strength are better under neutral and alkaline conditions than under acid conditions.

*Example 9*

A very important advantage is obtained when the aminoaliphatic chain polymer resins are used in conjunction with saponified sizes that lose their sizing properties under alkaline conditions such as rosin sizes, alkali metal stearates and the like. Paper fibers pretreated with 0.5% to 3% or more of aminoaliphatic chain polymer resins followed by treatment with these ordinary sizes retain their water resistance, ink resistance and other properties of sized paper even under strongly alkaline conditions.

Handsheets were made from the bleached kraft pulp used in the preceding examples. The pulp was suspended headings have the same meaning as those of the corresponding table in Example 7; the sizing tests are expressed as the number of seconds for the water or ink to penetrate the paper.

A comparison of the figures for percent resin in the sheet and for wet tensile strength with those of Example 8 shows that both the resin retention and the wet strength of the paper are materially improved by the addition of rosin size, whether alum is used or not. The sizing tests show clearly that good sizing is obtained under both acid and alkaline conditions and with and without the use of alum. This indicates that the aminoaliphatic chain polymer resins also function as precipitants or fixing agents for the size so that the use of alum may be unnecessary.

The advantages of applying this resin to paper containing alkaline fillers such as calcium carbonate filler are evident. The paper has good wet strength and when rosin size is used it also has good water resistance and ink resistance in spite of its alkaline condition. For example, a water suspension of beaten paper pulp may be impregnated with 0.5% to 3% of the aminoaliphatic chain polymer resin described above and then with 25% to 50% of a calcium carbonate filler based on the dry fiber weight. In making a sized sheet the aminoaliphatic resin should be added first, then the rosin size should be added and precipitated and the calcium carbonate filler should be added last, after which the furnish is formed into paper and dried by heating in the usual manner.

What we claim is:

1. A method of producing wet strength in paper which comprises applying to the fibers thereof about 0.1% to 5% by weight of an aminoaliphatic vinyl type polymer resin having a polymer chain composed of recurring ethylenic units including both amidoethylene units and aminoethylene units in the ratio of from 1 to 4 to 4 to 1, said chain containing from 0.2 to 4 such aminoethylene units for each 10 carbon atoms thereof.

2. A process for the production of wet strength paper which comprises adding to an aqueous suspension of cellulosic paper stock a hydrophilic aminoaliphatic vinyl type polymer resin having a polymer chain composed of recurring ethylenic units including both amidoethylene units and aminoethylene units in the ratio of from 1 to 4 to 4 to 1, said chain containing from 0.2 to 4 such aminoethylene units for each 10 carbon atoms thereof, adsorbing about 0.1% to 5% of said resin on said paper stock, forming the stock so treated into a waterlaid sheet, and drying the resulting sheet and thereby forming a resin bond between the fibers thereof.

3. A method according to claim 2 wherein the wet sheet is dried by heating at about 212° F. to 300° F. for about 0.1 to 5 minutes.

4. A process for the production of wet strength paper which comprises adding to an aqueous suspension of cellulosic paper stock a hydrophilic ethylenic polymer corresponding substantially to the formula

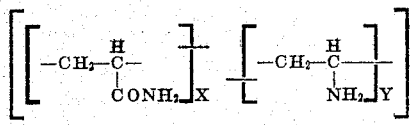

wherein the ratio of X to Y is from 1 to 4 to 4 to 1, adsorbing about 0.1% to 5% of said resin on said paper stock, forming the stock so treated into a waterlaid sheet, and drying the resulting sheet and thereby forming a resin bond between the fibers thereof.

5. A method according to claim 4 wherein the wet sheet is dried by heating at about 212° F. to 300° F. for about 0.1 to 5 minutes.

6. Paper having a uniform content of about 0.1% to 5% of its dry weight of an aminoaliphatic vinyl type polymer resin having a polymer chain composed of recurring ethylenic units including both amidoethylene units and aminoethylene units in the ratio of from 1 to 4 to 4 to 1, said chain containing from 0.2 to 4 such aminoethylene units for each 10 carbon atoms thereof.

7. Paper having a uniform content of about 0.1% to 5% of its dry weight of an aminoaliphatic chain polymer resin corresponding substantially to the formula

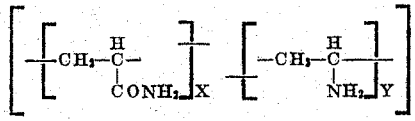

wherein the ratio of X to Y is from 1 to 4 to 4 to 1.

8. Paper having a uniform content of about 0.1–3% of its dry weight of an aminoaliphatic vinyl type polymer resin having a polymer chain composed of recurring ethylenic units including both amidoethylene units and aminoethylene units in the ratio of from 1 to 4 to 4 to 1 and sized with a saponified size, said paper being characterized by retention under alkaline conditions of the water-repellency imparted by said size.

9. Paper having a uniform content of about 0.1% to 3% of its dry weight of an aminoaliphatic chain polymer resin corresponding substantially to the formula

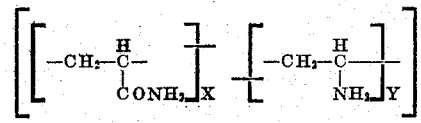

wherein the ratio of X to Y is from 1 to 4 to 4 to 1 and sized with a saponified rosin size, said paper being characterized by retention under alkaline conditions of the water-repellency imparted by said size.

References Cited in the file of this patent

UNITED STATES PATENTS

| | | |
|---|---|---|
| 2,276,840 | Hanford et al. | Mar. 17, 1942 |
| 2,315,675 | Trommsdorff | Apr. 6, 1943 |
| 2,334,476 | Coffman | Nov. 16, 1943 |
| 2,345,543 | Wohnsiedler | Mar. 28, 1944 |
| 2,535,690 | Miller et al. | Dec. 26, 1950 |

FOREIGN PATENTS

| | | |
|---|---|---|
| 842,186 | France | Feb. 27, 1939 |
| 898,577 | France | July 10, 1944 |

OTHER REFERENCES

Jones et al.: J. Org. Chem., November 1944, pp. 500, 501, 507.

Arcus: J. Polymer Science, April 1952, pp. 365–370.